(12) United States Patent
Olliphant

(10) Patent No.: US 8,364,566 B2
(45) Date of Patent: *Jan. 29, 2013

(54) METHOD FOR MANAGING GROUP FINANCES VIA AN ELECTRONIC NETWORK

(75) Inventor: Hugo Olliphant, San Francisco, CA (US)

(73) Assignee: eBay, Inc., San Jose, CA (US)

( * ) Notice: Subject to any disclaimer, the term of this patent is extended or adjusted under 35 U.S.C. 154(b) by 1199 days.

This patent is subject to a terminal disclaimer.

(21) Appl. No.: 12/025,223

(22) Filed: Feb. 4, 2008

(65) Prior Publication Data

US 2008/0195510 A1  Aug. 14, 2008

Related U.S. Application Data

(63) Continuation of application No. 09/633,962, filed on Aug. 8, 2000, now Pat. No. 7,343,335.

(51) Int. Cl.
G06Q 40/00 (2006.01)

(52) U.S. Cl. .............. 705/35; 705/36; 705/37; 705/38; 705/39; 705/40

(58) Field of Classification Search .................. 705/35, 705/36, 37, 38, 39, 40
See application file for complete search history.

(56) References Cited

U.S. PATENT DOCUMENTS

| | | | |
|---|---|---|---|
| 5,715,314 A | 2/1998 | Payne et al. | |
| 5,864,830 A | 1/1999 | Armetta et al. | |
| 5,884,280 A | 3/1999 | Yoshioka et al. | |
| 5,892,900 A | 4/1999 | Ginter et al. | |
| 5,903,721 A | 5/1999 | Sixtus | |
| 5,905,736 A | 5/1999 | Ronen et al. | |
| 5,953,710 A | 9/1999 | Fleming | |
| 5,960,411 A | 9/1999 | Hartman et al. | |
| 6,029,147 A | 2/2000 | Horadan et al. | |
| 6,044,360 A | 3/2000 | Picciallo | |
| 6,219,650 B1 | 4/2001 | Friend et al. | |

(Continued)

FOREIGN PATENT DOCUMENTS

| WO | WO-2006105202 A2 | 10/2006 |
|---|---|---|
| WO | WO-2006105202 A3 | 10/2006 |

(Continued)

OTHER PUBLICATIONS

"U.S. Appl. No. 09/633,962 Final Office Action mailed Feb. 7, 2005", 13 pgs.

(Continued)

*Primary Examiner* — Nga B. Nguyen
(74) *Attorney, Agent, or Firm* — Schwegman Lundberg & Woessner, P.A.

(57) ABSTRACT

The present invention provides a method of managing group finances via an electronic network. Transaction details are received from a member of group via an electronic network. The transaction details preferably include a shared expense containing an expense amount and at least one group member responsible for the expense. The transaction details are then assigned to the group and a payment specified-by the-transaction-details is allocated-among-group members-of-the-group. The method is repeated for a plurality of transactions. The finances of the group may also be balanced using accounting mathematics. Furthermore, an original expense value may be rounded up to a new expense value having a predefined number of decimal places, and a difference distributed between the new expense value and the original expense value to a third party.

48 Claims, 13 Drawing Sheets

U.S. PATENT DOCUMENTS

| | | | |
|---|---|---|---|
| 6,235,176 B1 | 5/2001 | Schoen et al. |
| 6,324,523 B1 | 11/2001 | Killeen, Jr. et al. |
| 6,327,578 B1 | 12/2001 | Linehan |
| 6,338,047 B1 | 1/2002 | Wallmann |
| 6,604,086 B1 | 8/2003 | Kolls |
| 6,615,183 B1 | 9/2003 | Kolls |
| 6,622,128 B1 | 9/2003 | Bedell et al. |
| 6,629,080 B1 | 9/2003 | Kolls |
| 6,732,919 B2 | 5/2004 | Macklin et al. |
| 6,839,689 B2 | 1/2005 | Aieta et al. |
| 6,882,979 B1 | 4/2005 | Reay et al. |
| 7,092,913 B2 | 8/2006 | Cannon, Jr. |
| 7,103,576 B2 | 9/2006 | Mann, III et al. |
| 7,143,064 B2 | 11/2006 | Picciallo et al. |
| 7,158,753 B2 | 1/2007 | Kagan et al. |
| 7,343,335 B1 * | 3/2008 | Olliphant | 705/36 R |
| 7,356,507 B2 | 4/2008 | Bezos et al. |
| 7,398,252 B2 | 7/2008 | Neofytides et al. |
| 7,401,731 B1 | 7/2008 | Pletz et al. |
| 7,430,516 B1 | 9/2008 | Blair et al. |
| 7,546,945 B1 | 6/2009 | Bucci et al. |
| 7,580,856 B1 | 8/2009 | Pliha |
| 7,890,422 B1 | 2/2011 | Hirka et al. |
| 7,925,591 B2 | 4/2011 | Gajjala et al. |
| 2002/0052841 A1 | 5/2002 | Guthrie et al. |
| 2002/0095372 A1 | 7/2002 | Likourezos et al. |
| 2002/0095376 A1 | 7/2002 | Likourezos et al. |
| 2002/0095377 A1 | 7/2002 | Likourezos et al. |
| 2002/0128932 A1 | 9/2002 | Yung et al. |
| 2002/0152179 A1 | 10/2002 | Racov |
| 2002/0169662 A1 | 11/2002 | Claiborne |
| 2002/0198847 A1 | 12/2002 | Fahraeus |
| 2003/0032409 A1 | 2/2003 | Hutcheson et al. |
| 2003/0120505 A1 | 6/2003 | Spiegel |
| 2003/0135470 A1 | 7/2003 | Beard |
| 2003/0220835 A1 | 11/2003 | Barnes, Jr. |
| 2004/0030601 A1 | 2/2004 | Pond et al. |
| 2004/0058694 A1 | 3/2004 | Mendiola et al. |
| 2004/0103060 A1 | 5/2004 | Foth et al. |
| 2004/0148254 A1 | 7/2004 | Hauser |
| 2004/0210517 A1 | 10/2004 | Brooks et al. |
| 2005/0096977 A1 | 5/2005 | Rossides |
| 2006/0167791 A1 | 7/2006 | Hahn-Carlson |
| 2006/0229998 A1 | 10/2006 | Harrison et al. |
| 2007/0005432 A1 | 1/2007 | Likourezos et al. |
| 2007/0118476 A1 | 5/2007 | Likourezos et al. |
| 2007/0156580 A1 | 7/2007 | Imrey et al. |
| 2009/0119207 A1 | 5/2009 | Grecia |
| 2009/0327128 A1 | 12/2009 | Olliphant |
| 2010/0191629 A1 | 7/2010 | Olliphant |

FOREIGN PATENT DOCUMENTS

| | | | |
|---|---|---|---|
| WO | WO-2006105202 B1 | 10/2006 | |

OTHER PUBLICATIONS

"U.S. Appl. No. 09/633,962 Non Final Office Action mailed Feb. 16, 2006", 11 pgs.

"U.S. Appl. No. 09/633,962 Non Final Office Action mailed Sep. 14, 2004", 13 pgs.

"U.S. Appl. No. 09/633,962 Response filed Oct. 28, 2004 to Non Final Office Action mailed Sep. 14, 2004", 16 pgs.

"Amazon Flexible Payments Service (Amazon FPS)", [Online]. Retrieved from the Internet: <URL: https://payments.amazon.com/sdui/sdui/business?sn=devfps/o>, (2009), 4 pgs.

"U.S. Appl. No. 09/633,962, Appeal Brief filed Oct. 11, 2005", 31 pgs.

"U.S. Appl. No. 09/633,962, Final Office Action mailed Nov. 28, 2003", 10 pgs.

"U.S. Appl. No. 09/633,962, Non Final Office Action mailed Jun. 5, 2003", 8 pgs.

"U.S. Appl. No. 09/633,962, Notice of Allowance mailed Oct. 17, 2007", 8 pgs.

"U.S. Appl. No. 09/633,962, Response filed May 28, 2004 to Final Office Action mailed Nov. 28, 2003", 11 pgs.

"U.S. Appl. No. 09/633,962, Response filed Aug. 28, 2003 to Non Final Office Action mailed Jun. 5, 2003", 6 pgs.

"U.S. Appl. No. 10/946,710, Appeal Brief Filed Mar. 20, 2008", 21 pgs.

"U.S. Appl. No. 10/946,710, Examiner's answer mailed Oct. 9, 2008 to Appeal Brief filed Mar. 20, 2008", 10 pgs.

"U.S. Appl. No. 12/207,383, Non-Final Office Action mailed Jun. 25, 2009", 16 pgs.

"U.S. Appl. No. 10/946,710, Final Office Action mailed Sep. 26, 2011", 8 pgs.

"U.S. Appl. No. 12/554,785, Non Final Office Action mailed Sep. 16, 2011", 10 pgs.

"U.S. Appl. No. 10/946,710, Decision on Appeal mailed Aug. 3, 2010", 7 pgs.

"U.S. Appl. No. 10/946,710, Non Final Office Action mailed Apr. 6, 2011", 8 pgs.

"U.S. Appl. No. 10/946,710, Reply Brief filed Dec. 9, 2008", 4 pgs.

"U.S. Appl. No. 10/946,710, Response Filed Jun. 21, 2011 to Non-Final Office Action", 15 pgs.

"U.S. Appl. No. 09/633,962, Supplemental Appeal Brief filed May 5, 2006", 28 pgs.

"U.S. Appl. No. 10/946,710, Decision on Pre-Appeal Brief Request mailed Sep. 21, 2007", 2 pgs.

"U.S. Appl. No. 10/946,710, Pre-Appeal Brief Request filed Jul. 24, 2007", 4 pgs.

"U.S. Appl. No. 10/946,710, Response filed Dec. 27, 2011 to Final Office Action mailed Sep. 29, 2011", 13 pgs.

"U.S. Appl. No. 11/095,411, Advisory Action mailed Sep. 8, 2011", 3 pgs.

"U.S. Appl. No. 11/095,411, Advisory Action mailed Nov. 19, 2009", 4 pgs.

"U.S. Appl. No. 11/095,411, Appeal Brief filed Dec. 12, 2011", 34 pgs.

"U.S. Appl. No. 11/095,411, Examiners Answer to Appeal Brief mailed Jan. 30, 2012", 30 pgs.

"U.S. Appl. No. 11/095,411, Final Office Action mailed Jun. 18, 2010", 16 pgs.

"U.S. Appl. No. 11/095,411, Final Office Action mailed Jul. 13, 2011", 24 pgs.

"U.S. Appl. No. 11/095,411, Final Office Action mailed Aug. 28, 2009", 17 pgs.

"U.S. Appl. No. 11/095,411, Non Final Office Action mailed Mar. 7, 2011", 20 pgs.

"U.S. Appl. No. 11/095,411, Non-Final Office Action mailed Feb. 27, 2009", 13 pgs.

"U.S. Appl. No. 11/095,411, Non-Final Office Action mailed Dec. 28, 2009", 15 pgs.

"U.S. Appl. No. 11/095,411, Pre-Appeal Brief Request Oct. 10, 2011", 5 pgs.

"U.S. Appl. No. 11/095,411, Preliminary Amendment filed Feb. 23, 2007", 11 pgs.

"U.S. Appl. No. 11/095,411, Preliminary Amendment filed Aug. 25, 2005", 8 pgs.

"U.S. Appl. No. 11/095,411, Response filed Mar. 29, 2010 to Non Final Office Action mailed Dec. 28, 2009", 13 pgs.

"U.S. Appl. No. 11/095,411, Response filed May 27, 2009 to Non Final Office Action mailed Feb. 27, 2009", 14 pgs.

"U.S. Appl. No. 11/095,411, Response filed Jun. 2, 2011 to Non-Final Office Action mailed Mar. 7, 2011", 20 pgs.

"U.S. Appl. No. 11/095,411, Response filed Aug. 25, 2011 to Final Office Action mailed Jul. 13, 2011", 21 pgs.

"U.S. Appl. No. 11/095,411, Response filed Oct. 18, 2010 to Final Office Action mailed Jun. 18, 2010", 14 pgs.

"U.S. Appl. No. 11/095,411, Response filed Oct. 28, 2009 to Final Office Action mailed Aug. 28, 2009", 13 pgs.

"U.S. Appl. No. 12/554,785 , Response filed Jan. 17, 2012 to Non Final Office Action mailed Sep. 16, 2011", 9 pgs.

"U.S. Appl. No. 12/554,785, Non Final Office Action mailed Mar. 30, 2012", 9 pgs.

"U.S. Appl. No. 12/554,785, Response filed Jul. 2, 2012 to Non Final Office Action mailed Mar. 30, 2012", 9 pgs.

"U.S. Appl. No. 12/752,976, Final Office Action mailed Jul. 5, 2012", 9 pgs.

"U.S. Appl. No. 12/752,976, Non Final Office Action mailed Jan. 27, 2012", 10 pgs.

"U.S. Appl. No. 12/752,976, Response filed Apr. 27, 2012 to Non Final Office Action mailed Jan. 27, 2012", 9 pgs.

"U.S. Appl. No. 13/535,189, Non Final Office Action mailed Aug. 17, 2012", 24 pgs.

"Australian Application Serial No. 11/491,112, First Fxarniner Report mailed Jan. 10, 2009", 2 pgs.

"Australian Application Serial No. 2006230277, Response filed Jan. 8, 2010 to First Examiner Report mailed Mar. 10, 2009", 17 pgs.

"Australian Application Serial No. 2010201969, Office Action Response filed Feb. 15, 2012", 18 pgs.

"Australian Application Serial No. 2010201Q6! First Examiner Report mailed Mar. 16, 2011", 2 Pgs.

"Chinese Application Serial No. 200680014449.7, Office Action mailed Jul. 29, 2010", with English translation of claims, 11 pgs.

"Chinese Application Serial No. 200680014449.7, Response filed Dec. 13, 2010 to Non Final Office Action mailed Jul. 29, 2010", with English translation of claims, 14 pgs.

"Chinese Application Serial No. 200680014449.7, Office Action mailed Mar. 15, 2011", with English translation of claims, (14 pgs).

"European Application Serial No. 06739940.2, Extended European Search Report Mailed Dec. 21, 2009", 4 pgs.

"International Application Serial No. PCT/US2006/011475, International Search Report mailed Dec. 12, 2006", 6 pgs.

"The Authoritative Dictionary of IEEE Standards Terms", IEEE 100, Seventh Edition IEEE Standards Information Network/IEEE Press, (Dec. 1, 2000), 37 pgs.

"Using your Cellphone as a Credit Card", The Wall Street Journal Online. WSJ.com, [Online]. Retrieved from the Internet: <URL: http://pqasb.pqarchiver.com/wsj/access/983215801.html?dids=983215801:983215801&FMT=FT&FMTS=>, (Feb. 8, 2006).

Arrington, Michael, "Everyone Send Me $5", Tech Crinch Article and Comments, [Online]. Retrieved from the Internet: <URL: http://www.techcrunch.com/2006/02/15/everyonesend-me-5> (Feb. 15, 2006), 13 pgs.

Cheong, Yu Chye, "Payments in Mobile Commerce", Telecom Media Networks, Wireless Internet Centre, http://www.apc.capgemini.com/industry/telecom/attachments/Payments%20in%20Mobile%20Commerce.pdf, (2002), 1-25.

Choi, Hyungki, et al., "Design of secure mobile payment", ICU PowerPoint Presentation, (Apr. 3, 2002), 1-7.

Cricket Communications, "Get Customer Support—FAQ's", [Online]. Retrieved from the Internet: <URL: http://www.mycricket.com/Cust_svc_opt_feat.aspx> (observed Feb. 2, 2005), (Copyright 2005), 6 pages.

Ding, Melissa Soo, "Reconsidering the Challenges of mPayments: A Roadmap to Plotting the Potential of the Future mCommerce Market", 16th Bled eCommerce Conference, eTransformation, Bled, Slovenia, (Jun. 9-11, 2003), 873-884.

Focarelli, D., et al., "Why Do Banks Merge?", Journal of Money, Credit, and Banking vol. 34, No. 4, (Nov. 2002), 1047-1066.

Godfrey, Mike, "Panama Bank Merge to Form Biggest Banking Group in Central America", Tax-news.com, New York Tuesday, (May 2000), 5 pgs.

Jagolinzer, Philip, "Personal Financial Planning: How to divide the family income", Ohio CPA Journal vol. 54, No. 2, (Apr. 1995), 39-40.

Kreyer, Nina, "Characteristics of Mobile Payment Procedures", Proceedings of the ISMIS 2002, (2002), 1-13.

Linder, J. C, et al., "Bank Mergers: Integration and Profitability", Journal of Finanical Services Research, (1992), 35-55.

Little, Arthur D, "Making M-Payments a Reality", Arthur D. Little Global M-Payment Report 2004, http://www.adlittle.de/downloads/artikel/MPayment_press%2Orelease_English_Final.pdf, (2004), 1-5.

Mckitterick, David, "State of the Art Review of Mobile Payment Technology", Trinity College Dublin—Computer Science Department, Technical Reports, (Jun. 13, 2003), 1-22.

Mobile Tech News, "Ringtones made available using packaging 'short codes'", [Online]. Retrieved from the Internet: <URL: http://www.mobiletechnews.com/info/2004/07/09/005946.html> (Observed Feb. 2, 2005), (Jul. 9, 2004), 27 pages.

Ondrus, Jan, et al., "A Disruption Analysis in the Mobile Payment Market", 38th Annual Hawaii International Conference on System Sciences (HICSS'05), (Jan. 3-6, 2005), 1-10.

Ondrus, Jan, "Mobile Payments: A Tool Kit for a Better Understanding of the Market", License Thesis—University of Lausanne, (Jul. 2003), 1-38.

Panis, Stathis, et al., "Mobile Commerce Service Scenarios and Related Business Models", Proceedings of the 1st International Conference on Mobile Business, (Jul. 8-9, 2002), 10 Pages.

Peirce, Michael, "Multi-Party Electronic Payments for Mobile Communications", A thesis submitted for the degree of Doctor of Philosophy in Computer Science, University of Dublin, Trinity College, Department of Computer Science, (Oct. 31, 2000), 1-219.

PR Newswire, "U.S. Cellular Introduces Web Browser for Cell Phones", Copyright © 19962003 PR Newswire Association LLC., [Online]. Retrieved from the Internet: <URL: http://prnewsire.com/computer-electronics/20041116/CGTU07616112004-1.html>, (Accessed Feb. 4, 2005), 2 pages.

Rodgers, Zachary, "SMA Short Codes come Alive on TV", [Online]. Retrieved from the Internet: <URL: http://web.archive.org/web/20030410191431/http://www.instantmessagingplanet.com/wireless/article.php/2118811> (Archived Apr. 10, 2003), (Mar. 19, 2003), 5 pages.

Rodgers, Zachary, "U.S. Wirelss Carriers Debut Universal Short Codes", [Online]. Retrieved from the Internet: <URL: http://www.instantmessagingplanet.com/wireless/article.php/3098231> (Observed Feb. 2, 2005), (Oct. 23, 2003), 4 pages.

Varshney, Upkar, "A Framework for the Emerging Mobile Commerce Applications", Proceedings of the 34th Hawaii International Conference on System Sciences—2001, (2001), 1-10.

Whois Source, "Common Short Code—CSC", [Online]. Retrieved from the Internet: <URL: http://www.whois.sc/common-short-code/> (Observed Feb. 2, 2005), (Copyright 1998-2005), 2 pages.

* cited by examiner

MODIFY PERSONAL INFO FOR HUGO

700

PLEASE USE THIS PAGE TO UPDATE YOUR PROFILE. ONLY CHANGE THOSE FIELDS THAT YOU WOULD LIKE TO CHANGE. CLICK "SUBMIT" WHEN YOU HAVE FINISHED.

| | |
|---|---|
| FIRST NAME.... | HUGO 702 |
| LAST NAME.... | HUGO |
| EMAIL ADDRESS.... | HUGO |

TO CHANGE YOUR PASSWORD, ENTER YOUR OLD PASSWORD HERE:

| | |
|---|---|
| OLD PASSWORD:.... | HUGO |
| NEW PASSWORD: (6-15 CHARACTERS, PLEASE).... | HUGO 704 |
| VERIFY PASSWORD:.... | HUGO |

WHAT IF YOU FORGOT YOUR PASSWORD? THAT'S OKAY, WE'LL TEST YOU WITH A SECRET QUESTION. PLEASE ANSWER ONE OF THE QUESTIONS BELOW

| WHO IS THE OBJECT OF MY DESIRE (AND DOES MY BOY/GIRLFRIEND KNOW ABOUT HIM/HER?) ▼ |

| | |
|---|---|
| NOW ENTER THE SECRET ANSWER TO YOUR QUESTION.... | ******* |
| HOW OFTEN WOULD YOU LIKE TO RECEIVE THE MONEY NEWSLETTER? | QUARTERLY ▼ |

FINISH 708    CANCEL 710

*Fig. 7*

SUMMARY FOR HUGO'S RESIDENTS +

THIS GROUP OWES YOU $133.67.
THERE IS $120.00 IN COMMITMENTS IN THE SLUSH FUND.
HUGO'S RESIDENTS + CASH BALANCE IS $2.00
MEMBERS HAVE BEEN DELETED FROM THIS GROUP.
ON NET, THESE MEMBERS STILL OWE THE GROUP $171.66 IN DEBT.
— 902

SETTLE THE SLUSH FUND — 904
CLAIM CASH — 906
REMOVE/ALLOCATE THIS — 908

— 910
CLAUDINE DESCHEEMAECKER   OWES $40.00 TO THE GROUP
HUGO AT YAHOO   OWES $40.00 TO THE GROUP   HAS NOT YET JOINED
INVITE AGAIN — 914
ERIC PAYNE   IS SETTLED WITH THE GROUP

ENTER NEW MEMBERS' EMAIL ADDRESSES HERE   ADD MEMBERS — 916

POST NEW MESSAGE — 918

ADD TRANSACTION — 1016
REQUEST SETTLEMENT — 1018
GROUP SUMMARY — 1020
PERSONAL OPTIONS — 1022
VIEW HISTORY — 1024
ADD/JOIN A GROUP — 1026
GROUP ADMINISTRATION — 1028

*Fig. 9*

TRANSACTION HISTORY FOR HUGO'S GROUP ~1000

DATE RANGE: [1002] TO [1004] INVOLVING

[CLAUDINE DESCHEEMAECKER ▼] 1034

ENTERED BY: [ANYONE ▼] 1006    CATEGORY: [ALL CATEGORIES ▼] 1008

☐ INCLUDE DELETED AND MODIFIED TRANSACTIONS    [SEARCH] 1010

---

20192                                                                          1032

MAY 17, 2000   CLAUDINE DESCHEEMAECKER        OWES        $40.00

DUES/DISTRIBUTIONS: (NO DESCRIPTION) (TOTAL WAS $120.00)

[DELETE] 1012   [MODIFY] 1014

---

[ADD TRANSACTION] 1016   [REQUEST SETTLEMENT] 1018   [GROUP SUMMARY] 1020   [PERSONAL OPTIONS] 1022

[GROUP DETAIL] 1030   [ADD A GROUP] 1026   [GROUP OPTIONS] 1028

*Fig. 10*

ADD TRANSACTION TO GROUP: HUGO'S RESIDENTS+

06/01/2000 — 1102

WHO BEGAN THIS TRANSACTION?

SOME OR ALL MEMBERS (SPLIT)
HUGO OLIPHANT
CLAUDINE DESCHEEMAEKER
HUGO AT YAHOO
ERIC PAYNE

1106

WHAT DID HE/SHE DO?

PAID — 1104

HOW MUCH?

171.66 — 1108

WAS IT FOR SOMETHING TO BE SPLIT OR WAS IT DIRECTLY TO (AN)OTHER GROUP MEMBER(S)?

TO HUGO OLIPHANT
FOR A SPLIT EXPENSE
TO SLUSH FUND
TO SOME OR ALL MEMBERS (SPLIT)
TO EACH MEMBER

1112

FOR WHAT? NONE — 1110
DESCRIPTION: TO ALLOCATE BALANCES LEFT — 1114

[CONTINUE] — 1116    [CANCEL] — 1118

*Fig. 11*

ALLOCATE AMOUNTS HUGO'S RESIDENTS+

ON NET, $120.00 HAS BEEN COMMITTED TO THE SLUSH FUND. WHO SHOULD GET THESE COMMITMENTS? IF YOU WOULD LIKE TO SEE THE TRANSACTIONS THAT MAKE UP THIS BALANCE, PLEASE:

HOW DO YOU SPLIT THIS UP?

| GROUP MEMBER | AMOUNT | EXCLUDE |
|---|---|---|
| HUGO OLIPHANT | 30.00 — 1202 | ☐ |
| CLAUDINE DESCHEEMAEKER | 30.00 | ☐ |
| HUGO AT YAHOO | 30.00 | ☐ |
| ERIC PAYNE | 30.00 | ☐ — 1204 |
| TOTAL ALLOCATION AMOUNT | 120.00 | |

[CLEAR] — 1206  [SPLIT EVENLY] — 1210  [DONE] — 1208  [CANCEL] — 1212

*Fig. 12*

GROUP ACCESSIBILITY:
1302 — ● PRIVATE
○ PUBLIC

AS A PUBLIC GROUP, PEOPLE WHO ALREADY KNOW YOUR EMAIL ADDRESS CAN ASK TO JOIN YOUR GROUP. YOU DECIDE WHO TO ACCEPT OR REJECT. AS A PRIVATE, ONLY YOU AND YOUR GROUP MEMBERS WILL KNOW THIS GROUP EXISTS

AUTO REMINDERS:
1304 — ● AUTOMATICALLY REMIND MEMBERS TO SETTLE UP AFTER EVERY TRANSACTION
● AUTOMATICALLY REMIND MEMBERS TO SETTLE UP ANYTIME SOMEONE OWES OR IS OWED MORE THAN [ 500.00 ] — 1308

1306 — ● AUTOMATICALLY REMIND MEMBERS TO SETTLE UP [ BIWEEKLY ▼ ] — 1310
○ DO NOT AUTOMATICALLY SEND REMINDERS

MEMBER PRIVILEDGES:

1312 —
| HUGO OLIPHANT: | ☑ HAS ADMINISTRATIVE RIGHTS<br>☑ CAN WITHDRAW CASH FROM THE GROUP<br>☐ CHECK TO REMOVE THIS MEMBER |

| CLAUDINE DESCHEEMAECKER: | ☑ HAS ADMINISTRATIVE RIGHTS<br>☑ CAN WITHDRAW CASH FROM THE GROUP<br>☐ CHECK TO REMOVE THIS MEMBER |

| HUGO AT YAHOO: | ☑ HAS ADMINISTRATIVE RIGHTS<br>☑ CAN WITHDRAW CASH FROM THE GROUP<br>☐ CHECK TO REMOVE THIS MEMBER |

| ERIC PAYNE | ☑ HAS ADMINISTRATIVE RIGHTS<br>☑ CAN WITHDRAW CASH FROM THE GROUP<br>☐ CHECK TO REMOVE THIS MEMBER |

ADMINISTRATIVE RIGHTS INDICATES THAT AN INDIVIDUAL HAS THE RIGHT TO ADD AND DELETE MEMBERS FROM THE GROUP. ADDITIONALLY A USER WITH ADMINISTRATIVE RIGHTS CAN DETERMINE WHETHER OTHER MEMBERS CAN WITHDRAW CASH

[ SUBMIT CHANGES ] — 1314  [ CANCEL ] — 1316

*Fig. 13*

JOIN AN EXISTING GROUP

IF YOU WANT TO JOIN AN EXISTING GROUP:
PLEASE ENTER THE EMAIL ADDRESS OF SOMEONE WHO IS IN THE GROUP YOU WOULD LIKE TO JOIN

[ENTER EMAIL ADDRESS HERE] ~1402

[JOIN AN EXISTING GROUP] ~1404

*Fig. 14*

CREATE A NEW GROUP

OR YOU CAN CREATE A NEW GROUP GROUP:

ENTER THE NAME OF YOUR GROUP.... [HUGO'S GROUP] ~1502

TYPE OF GROUP.... [ROOMMATE ▼] ~1504

PLEASE ENTER THE EMAIL ADDRESSES OF THOSE YOU WOULD LIKE TO INVITE INTO THIS GROUP (SEPARATE ADDRESSES WITH COMMAS, RETURNS OR SPACES) ~1506

INVITATION MESSAGE: WHOA! THIS GMONEY SERVICE IS GOING TO ~1508

[GO TO GROUP OPTIONS] ~1510

[DONE. (ACCEPT DEFAULT OPTIONS)] ~1512

*Fig. 15*

METHOD FOR MANAGING GROUP FINANCES VIA AN ELECTRONIC NETWORK

RELATED APPLICATION

The present application is a continuation of U.S. patent application Ser. No. 09/633,962 filed on Aug. 8, 2000 now U.S. Pat. No. 7,343,335 and entitled "Method For Managing Group Finances Via An Electronic Network", which application is incorporated herein by reference.

TECHNICAL FIELD

The present invention relates generally to electronic commerce and more particularly to online management of group finances via an electronic network.

BACKGROUND OF THE INVENTION

Recently, with the tremendous growth of the Internet, numerous Internet based companies have emerged which provide a service which allows individuals to pay all of their bills online at a single Web-site. Such companies include Statusfactory.com®, Paytrust.com®, and Paymybills.com®, to name but a few. Individuals can have their bills redirected to one of the aforementioned companies who capture their bills and present them to the individual on a Web-site. The individual can then pay his or her bills directly through the Web-site and/or set up rules for the automatic payment of any bills received. Individuals using such sites, therefore, no longer have to review each bill sent to them from creditors, write checks out to those creditors, and post the checks to each creditor thus saving time, and costs such as stamp costs and any late payment charges should they fail to pay a bill on time. It has been estimated that about 30 million households currently make use of online banking and bill payment.

Such services, however, are typically only directed at individuals. To date, no easy means exists which addresses the problems that arise when individuals participating in group related activities spend money on behalf of the group. Group activities, such as joint ventures, ski trips, bachelor parties, shared households, office lunch groups, and clubs and organizations often lead to complicated settlement arrangements. For example, consider the life of three roommates: one person buys supplies for a housewarming party, while another pays the gas and phone bill. The third roommate pays the electric bill and for a pizza on Superbowl Sunday. The financial inter-obligations become unwieldy with only a few transactions. This problem arises any time individuals spend money together, not just in shared household situations where it is estimated that there are 74 million shared households in the U.S. (American Housing Survey for the United States: 1997), but also for office lunch groups, clubs, events, parties, wish lists, investment groups, wagering pools, organizations, clubs, or the like.

Person-to-person (P2P) payment providers such as PayPal.com® and PayMe.com® have emerged that offer payments and payment requests from one consumer to another. A popular application of this P2P technology involves the payment for goods purchased at online auction sites. While the P2P providers offer robust payment options for consumers, including a transaction history for individuals, none address the need for group accounting. These are payment solutions only and do not allow for the tracking of expenses and transactions unless a payment has occurred.

Furthermore, companies such as Intuit® offers a personal accounting software. Personal accounting software allows individuals to track their personal expenses and transactions on an on-going basis. Again, however, there is no group accounting functionality available and there are no features designed to track group expenses and group transactions.

Therefore, a convenient system whereby group members can view, split, balance a group's finances, pay group expenses, and deposit money into a group account would be highly desirable.

BRIEF DESCRIPTION OF THE DRAWINGS

For a better understanding of the nature and objects of the invention, reference should be made to the following detailed description, taken in conjunction with the accompanying drawings, in which:

FIG. 7 is an illustration of a graphical user interface of a "Member page" used in accordance with an embodiment of the invention;

FIG. 9 is an illustration of a graphical user interface of a "Specific group's summary page" used in accordance with an embodiment of the invention;

FIG. 10 is an illustration of a graphical user interface of a "Transaction history page" used in accordance with an embodiment of the invention;

FIG. 11 is an illustration of a graphical user interface of an "Add new transaction page" used in accordance with an embodiment of the invention;

FIG. 12 is an illustration of a graphical user interface of a "Complex transaction page" used in accordance with an embodiment of the invention;

FIG. 13 is an illustration of a graphical user interface of a "Group options page" used in accordance with an embodiment of the invention;

FIG. 14 is an illustration of a graphical user interface of a "Join an existing group page" used in accordance with an embodiment of the invention; and FIG. 15 is an illustration of a graphical user interface of a "Create a new group page" used in accordance with an embodiment of the invention;

Like reference numerals refer to corresponding parts throughout the several views of the drawings.

DETAILED DESCRIPTION OF THE INVENTION

Figure 1:
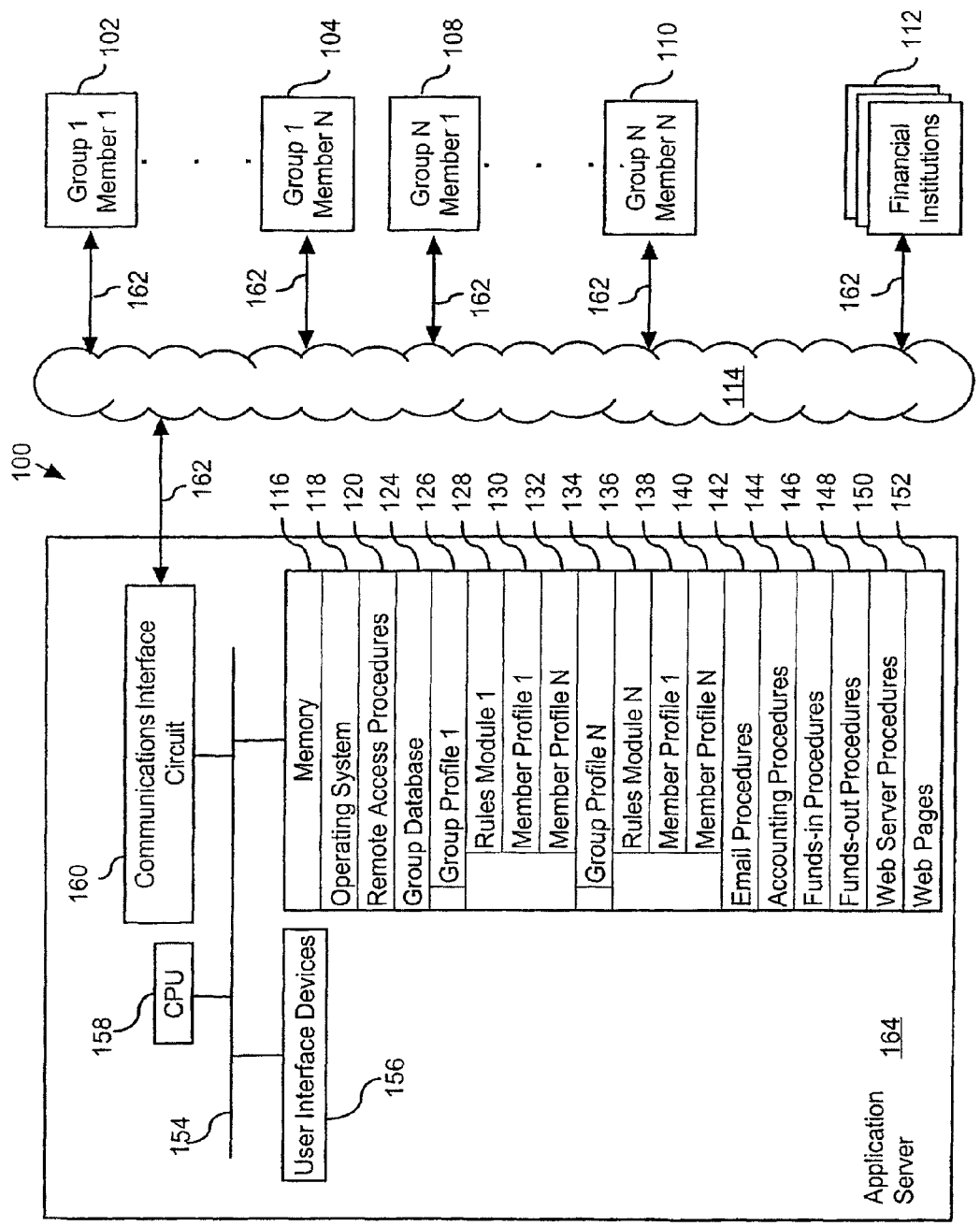
FIG. 1 is a diagrammatic view of an electronic network for managing the finances of a group in accordance with an embodiment of the present invention.

FIG. 1 is a diagrammatic view of an electronic network 100 for managing the finances of a group in accordance with an embodiment of the present invention. Network 100 comprises a series of points or nodes interconnected by communication paths. Network 100 may interconnect with other networks, contains subnetworks and may be embodied by way of a local area network (LAN), a metropolitan area network (MAN), a wide area network (WAN), or a global network (the Internet). The network 100 may further be characterized by the type of access service used, such as PSTN (Public Switched Telephone Network), ISDN (Integrated Services Digital Network), DSL (Digital Subscriber Line), ATM (Asynchronous Transfer Mode), T-carrier system, etc. In addition, network 100 may be characterized by the type of protocols used on it, such as TCP/IP (Transmission Control Protocol/Internet Protocol), NetBEUI (NetBIOS Extended User Interface), or IPX/SPX (Internetwork Packet Exchange/ Sequenced Packet Exchange). Additionally, network 100 may be characterized by whether it carries voice, data, or both kinds of signals; by who can use the network 100 (whether it is public or private); and by the usual nature of its connections (e.g. dial-up, dedicated, switched, non-switched, or virtual connections).

Network 100 connects a plurality of group members 102 to 110, and financial institutions 112 to at least one application server 164. This connection is made via a communication network 114 which may for example comprise an Intranet, wireless network, or preferably the Internet. The connection is made via communication links 162, which may, for example, be-coaxial cable, copper wire (including PSTN), optical fiber, wireless, microwave, or satellite links.

For ease of explanation, the individual or entity that controls the application server 164 will hereinafter be referred to as the service provider. It should be understood that the group members, financial institutions, and/or the service provider may be individuals, businesses, organizations or the like. Furthermore, the service provider and the financial institutions may be distinct entities or a single entity.

As used herein, a group member is defined as any individual who forms part of a group set up by group members with the service provider. Financial institutions, as used herein, incorporates all financial services organizations, such as banks or the like.

Application server 164 preferably comprises at least one data processor or central processing unit (CPU) 158, a memory 116, user interface devices 156, a communications interface circuit 160, and at least one bus 154 that interconnects these elements. Memory 116 preferably includes an operating system 118 (such as Windows NT™, Linux™, or MacOS™), which stores instructions for communicating, processing data, accessing data, storing data, searching data, etc. Memory 116 also includes remote access procedures 120, email procedures 142, accounting procedures 144, funds-in procedures 146, funds-out procedures 148, Web server procedures 150, Web pages 152, and a group database 124. Group database 124 preferably includes group profiles 126 and 134. Each group profile 126 or 134 preferably contains a number of member profiles 130, 132, 138, and 140. Each member profile 130, 132, 138, or 140 preferably contains member information, such as group member details, member account details, financial institution details, etc. Each group profile 126 or 134 preferably also includes a rule module 128 or 136. The various procedures and the group database 124 will be explained in further detail below.

Group members 102 to 110 typically access the communication network 114 via remote client computing devices, such as desktop computers, handheld computers, personal digital assistants (PDAs), or the like. The financial institutions 112 include a financial institution server similar to the application server 164. The client computing devices and financial institution server preferably also include a data processor or central processing unit (CPU), user interface devices, communications interface circuits, memory, and buses similar to those described in relation to application server 164.

Group members 102 to 110 preferably connect to the communication network 114 using an Internet browser, such as Microsoft's Internet Explorer® or Netscape's Navigator®, via their computing device's communication interface circuit, which preferably comprises a modem or network interface card (NIC). The path of data between the computing devices and the communication network is preferably: Internet Browser→Winsock (TCP/IP module of Windows®)→ (modem or NIC)→ISP Modem or Hub→Router→Internet. Once connected to the communication network, the group members navigate to a uniform resource locator (URL) pointing to the application server's home Web-site. The application server 164 then delivers Web pages 152 using Web server procedures 150.

Figure 2:
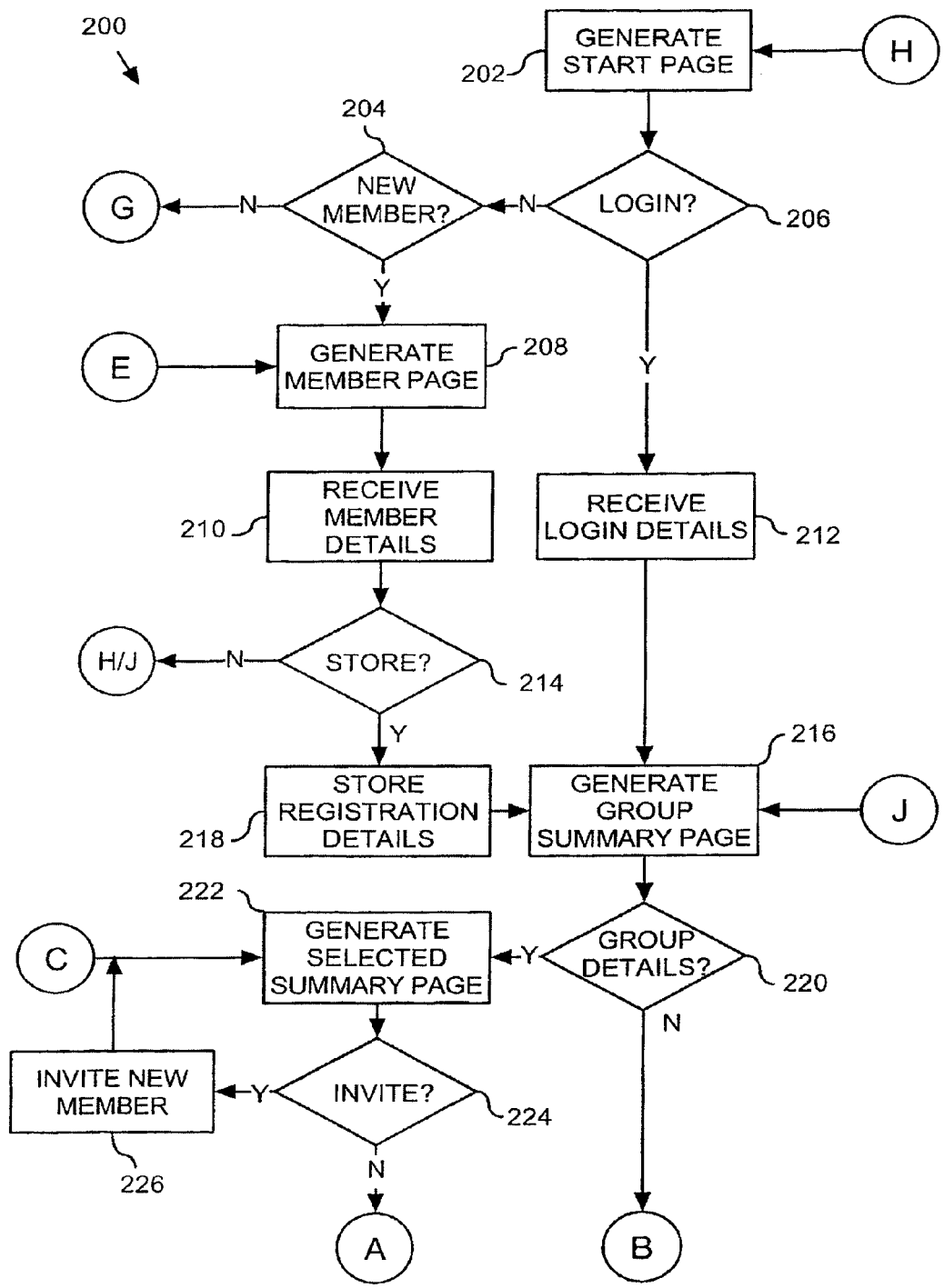
FIG. 2 is a flow chart of an application server side method of managing the finances of group in accordance with an embodiment of the present invention.
Figure 8:
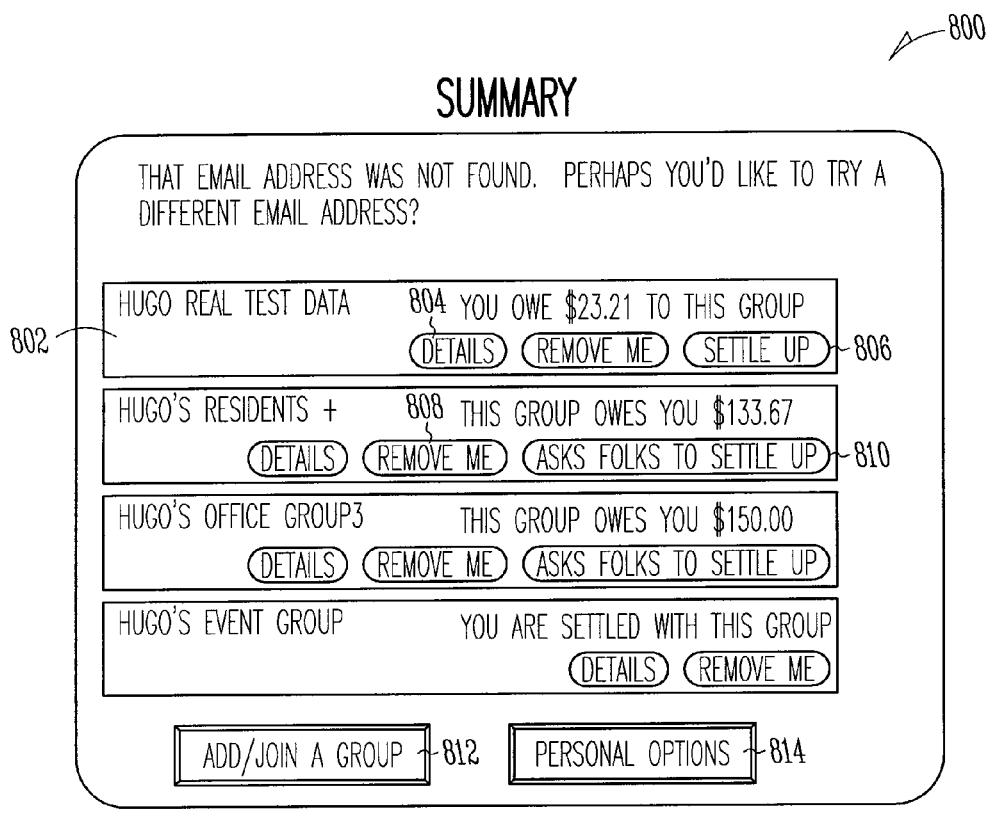
FIG. 8 is an illustration of a graphical user interface of a "Group summary page" used in accordance with an embodiment of the invention.

FIG. 2 is flow chart of a method for managing group finances via an electronic network according to an embodiment of the invention. The application server (164 of FIG. 1) using the web server procedures (150 of FIG. 1) and Web pages (152 of FIG. 1) generates a "home start page" (step 202) an embodiment of which is shown in FIG. 6. The system then determines whether a group member would like to log into the system (step 206). In a preferred embodiment of the invention, if a group member would like to log into the system, the system receives login details, such as a username or email address (610 of FIG. 6) and password (612 of FIG. 6), at 212, and then generates and displays a "group summary page" (step 216) an embodiment of which is shown in FIG. 8. All communication after login is secure, preferably use SSL (Secure Sockets Layer) technology. If a group member does not want to login (step 206) the system then determines if the person accessing the system is a new member (step 204). If the person accessing the system is not a new member, the system then determines if the person accessing the system would like to add to, or join, an existing group (502 of FIG. 5).

If the person accessing the system is a new member, the system generates a "new member page" (step 208), an embodiment of which is shown in FIG. 7, and receives the new member's details (step 210). The system then determines (step 214) whether the person accessing the system would like to store their details or not. If the new member would not like to store his/her details, i.e. cancels the new member application, the system either generates the start page (step 202) or if the member has modified his/her details (as explained in relation to FIG. 3), the system generates a (unmodified) group summary page (step 216). If the new member would like to store his/her details, the system stores the new member's registration details, (step 218), and then generates the group summary page (step 216). In this way a group fund is preferably established for plurality of group members.

The system then determines (step 220) whether the group member would like to view the details for any of the groups that he/she belongs to. If the group member would like to view a group's details, the system generates and displays a summary page for a selected group (step 222), an embodiment of which is shown in FIG. 9. The system then determines (step 224) whether the group member would like to invite another individual to join a group. If the group member would like to invite a new member to join a group, the new member is invited (step 226) preferably by email. This could be, for example, where a new person moves into a shared expenses apartment. After the new member has been invited to join a group the selected group's summary page is again generated and displayed (step 222). If the group member would not like to invite a new member to join a group, the system then determines if the group member would like to email another individual (306 of FIG. 3). If the group member would not like to view a group's details (step 220) the system then determines whether the group member would like to be removed from a specific group (302 of FIG. 3).

Figure 3:
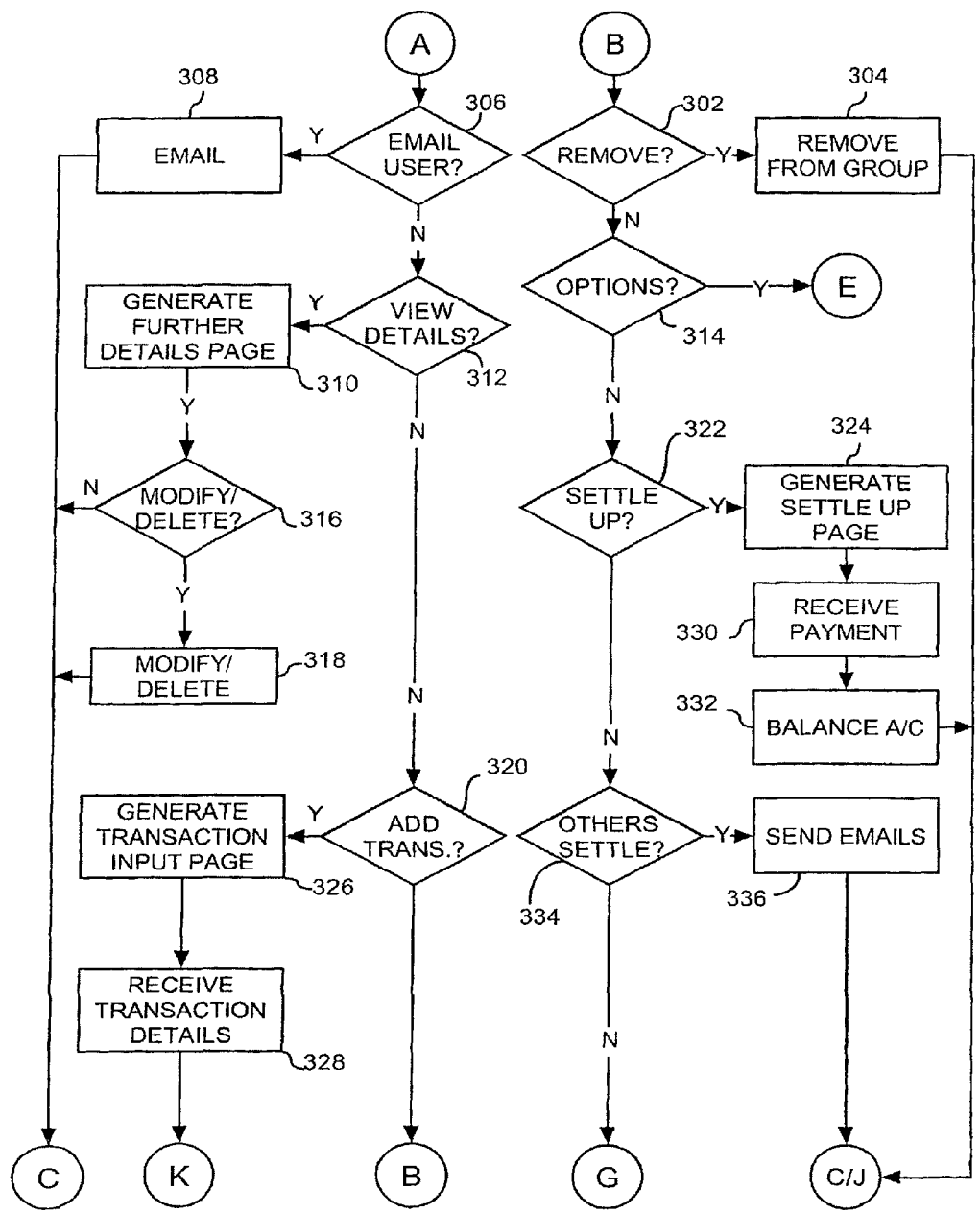
FIG. 3 is a continuation of the flow chart of FIG. 2.

FIG. 3 is a continuation of the flow chart of FIG. 2. If the group member would not like to invite a new member to join a group, the system determines if the group member would like to email another individual (step 306). This may be the case, for example, where the member would simply like to send an email to another member or members, or the group member would like to re-invite an individual to join a group. If the group member would like to send an email, an email is generated and sent (step 308) and the selected group summary page is re-displayed (222 of FIG. 2). If the member does not want to send an email, the system determines whether the member would like to view a group's transaction details (step 312). If the system determines that the member would like to view a group's transaction details, a "transaction history page" is generated and displayed to the member (step 310), an embodiment of which is shown in FIG. 10. The system then determines whether the member would like to modify or delete any transactions, at 316. If the member would not like to modify or delete any transactions, the selected group summary page is re-displayed (222 of FIG. 2). If the member would like to modify or delete any transactions, the modifications or deletions are made (step 318) after which the group summary page is re-displayed (222 of FIG. 2).

If the system determines that the member would not like to view a selected group's transaction details (step 312) the system then determines whether the group member would like to add a new transaction (step 320). The new transaction may be a new group expense or a payment from a group member to a group. If the system determines that a group member would like to add a new transaction (step 320), a "add new transaction page" is generated and displayed to the group member (step 326), an embodiment of which is shown in FIG. 11.

Once the group member has added a new transaction, the new transaction details are received (step 328) and added to that specific group's profile (128 and 134 of FIG. 1). The transaction details preferably include a shared expense of the group, containing an expense amount and at least one group member responsible for the expense. Alternatively, the transaction details may include remuneration details from a group member, such as the member's account details at a financial institution and the amount he or she should be remunerated. The system then determines if the transaction involves a simple or a complex allocation (404 of FIG. 4). If the system determines that a group member would not like to add a new transaction (step 320), the system determines whether the user would like to remove a member from the group (step 302).

Figure 4:
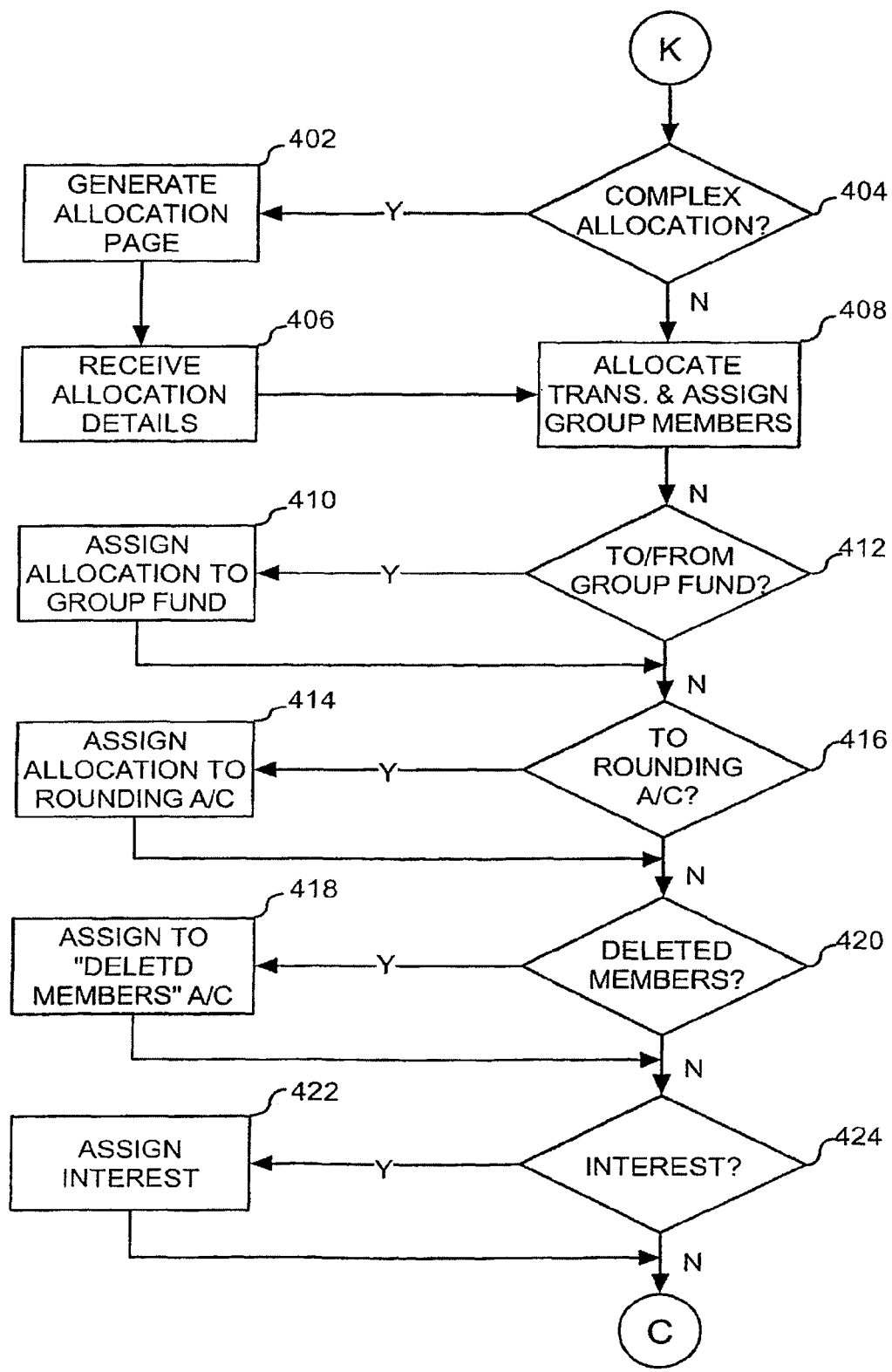
FIG. 4 is a continuation of the flow chart of FIG. 3.

FIG. 4 is a continuation of the flow chart of FIG. 3. If the system determines that the transaction involves a complex allocation (step 404), such as splitting or dividing financial obligations like an expense among some or all of a group's members, a "complex allocation page" is generated and displayed (step 402). Once the member has submitted the complex allocation details, these details are received (step 406). In either the complex or simple allocation cases, the transaction is processed (step 408) using the rule modules (128 and 136 of FIG. 1) for each group, together with the accounting procedures (144 of FIG. 1). This processing of the transaction generally includes allocating each transaction to a group and assigning payments included in the transaction among group members. This may preferably include debiting a group fund with an expense specified in the transaction details and allotting the expense among the group members in a manner specified in the transaction details. Alternatively, this may include crediting the group fund with remuneration specified in the transaction details and allotting the remuneration among the group members in a manner specified in the transaction details. This allocation and assignment is described in further detail below in relation to FIG. 11.

The system then determines whether the transaction involves a payment to or from a group fund (step 412). A group fund is a fund set up by the group members for a special purpose. Such a fund might be a "car pool fund", "a gift fund", "a phone bill fund" or any of a variety of account used to collect commitments and unallocated expenses. For example, a fund might be set up to purchase a gift where everyone is asked to put in $50 beforehand. In this case, a commitment of $50 is collected in the group fund from each member. If the transaction involves a payment to or from a group fund, then an allocation to a specific group fund and an assignment between individual group members of that group fund is made (step 410). All financial balancing calculations are preferably undertaken using standard accounting mathematics.

During any of its accounting calculations, the system preferably round off all original expense values to a new expense value having a predefined number of decimal places, and distributes a difference between the new expense value and the original expense value to a rounding account of a third party, preferably the service provider. For example, say an expense of $10 must be split between three group members, John, Nancy and Susan. Each group member would, therefore, owe $10/3=$3.333 . . . . The system may round the amount owed to a set number of decimal places. If John paid $10 for an expense to be split among John, Nancy, and Susan, the expense is rounded up to $3.34 for each person. If, however, John owes $10 for an expense to be split among John, Nancy, and Susan, then the expense is rounded down to $3.33, which is paid to each group member. In both cases, the remainder of $0.1 is credited to a rounding account for the benefit of a group or a third party, such as the service provider. After the system determines whether the transaction involves a payment to or from a group fund (step 412), the system determines whether during any of its accounting calculations, a remainder was generated (step 416) and if so assigns the remainder to the rounding account (step 416).

The system then determines (step 420) whether any members have been deleted or have left a group. When members are deleted from the group, their balance is assigned to a "Deleted Members" account for non-members (step 418). The group may allocate those funds whenever they wish. This allocation may be a proportional split between group members or may vary depending on the rules module (128 or 136 of FIG. 1) set up for that group.

The system then preferably determines whether according to the rules module, a group member should be charged interest for paying late or should be paid interest for paying early. Such a charge or payment of interest is established either by the group members or by the service provider. For example, an investment group may require an appropriate economic return to members that pay for stocks on behalf of other members. An alternative embodiment utilizes an interest spread where a group member is charged a higher interest for a late payment than that payed out to an group member who makes an early payment. A third party, such as the service provider, retains the difference between the interest received and the interest payed out (the interest difference). For example, a group member who makes an early payment may be paid say 19% interest on the funds payed until such time as the expense is due. A group member who pays after the expense is due may be charged 21% interest until such time that he/she pays the group. The difference between the 21% and the 19%, i.e. 2%, is kept by the service provider. Therefore, the system determines (step 424) whether any interest is due, and assigns the interest to the necessary accounts (step 422). In the case where an interest spread is used, the interest difference may be assigned to a separate interest account or to the rounding account. The system then generates and displays the summary page (step 222 of FIG. 2).

Returning to FIG. 3, if the system determines that the group member would like to be removed from a specific group (step 302), that person is removed from the group (step 304). The rules module for that group may be set up so that only under certain conditions may a member be removed, such as when a member is delinquent in paying his/her share towards a group expense. If the system determines that the group member would not like to be removed from a specific group (step 302), the system then determines whether the member would like to change his member details or options (step 314). If the member would like to change his/her options, a "member page" is generated (step 208 of FIG. 2) and the modified details received (step 210 of FIG. 2).

If the member does not want to change his/her options (step 314), the system then determines if any member would like to settle up his/her obligations (pay what is owed) to the group account (step 322). If a member would like to settle up, a "settle up page" is generated (step 324) wherein a member can enter information to settle up his/her obligations, such as financial institution information, account numbers, amounts, etc. This payment information is received (step 330), the account is balanced (step 332), and depending on the page the member was previously viewing, the member is displayed either the group summary page (216 of FIG. 1) or the selected group summary page (222 of FIG. 1).

If a member does not want to settle up, the system determines whether a member would like to ask the other members of a group to settle up (step 334). If the system determines that a member would like to ask the other members of a group to settle up, the system contacts the other members, preferably via email, to settle up the group account (step 336). Depending on the page the member was previously viewing, the member is displayed either the group summary page (216 of FIG. 1) or the selected group summary page (222 of FIG. 1). If the system determines that a member does not want to ask the other members of a group to settle up, the system determines whether the member would like join another existing group (step 504 of FIG. 5).

Figure 5:
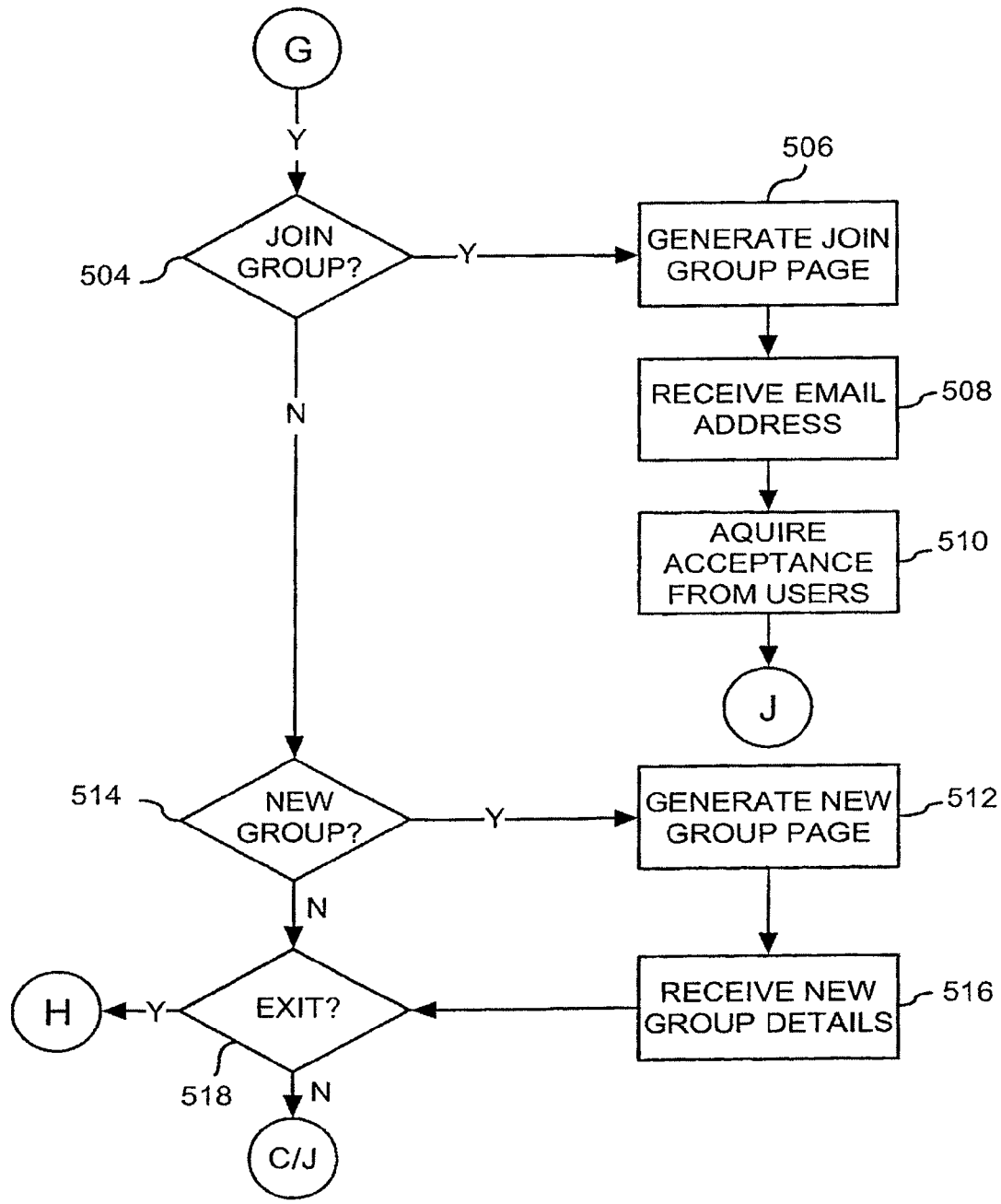
FIG. 5 is a continuation of the flow chart of FIG. 4.
Figure 6:
FIG. 6 is an illustration of a graphical user interface of a "Home start page" used in accordance with an embodiment of the invention.

FIG. 5 is a continuation of the flow chart of FIG. 4. If the system determines that the member wants to join another existing group, the system generates a "join a new group page" (step 506), an embodiment of which is shown in FIG. 15. Details, such as the members email address, are entered into the join a new group page and received (step 508). If all the other members of the group that the member would like to join accept the member to their group (step 510) the member is added to the group and the group summary page is displayed (step 216 of FIG. 2).

If the system determines that the member does not want to join another existing group (step 504), the system then determines whether the member would like to start a new group (step 514). If the member would like to start a new group, a "new group page" is generated (step 512) and new group details are received (step 516) and saved in a new group profile. The system then determines whether the member would like to exit the system (step 518). If the member would like to exit the system, the member is exited from the secure part of the system and the start page is displayed (step 202 of FIG. 2). If the member does not want to exit the system, either the group summary page (216 of FIG. 1) or the selected group summary page (222 of FIG. 1) is displayed depending on the page the member was previously viewing.

FIG. 6 is an illustration of a graphical user interface of a "Home start page" 600 used in accordance with an embodiment of the invention. To gain access to the system, a member typically enters security details, such as an email 610 address and password 612. If the user is new, he/she may register with the system by clicking on the new user button 618, which will displays a "modify personal info page", similar to that shown in FIG. 7. A member may also start a new group by either clicking on the "Start new group" button 602, or by clicking on any one of a number of standard groups 614 set up for different group activities, such as for joint camping trips. Clicking on either the start new group button 602 or standard groups 614 will display a "Create new group page", as shown in FIG. 15. If the member would like to add an expense to the group account, he/she may do so my clicking on either the "Add expense" button 604 or any one of numerous set expenses 616, such as joint grocery expenses. Clicking on either the add expense button 604 or one of numerous set expenses 616, will display an "Add transaction page", as shown in FIG. 11. A member may also deposit funds, or withdraw funds by clicking on a pay/withdraw button 606. Such withdrawal or deposit may occur electronically, such as via a credit card or electronic check.

FIG. 7 is an illustration of a graphical user interface of a "Member page" 700 used in accordance with an embodiment of the invention. This page is displayed when signing up a new member or when a member modifies his/her details. Details, such as member name 702, email address, and password 704, are entered into the various fields on the page. By clicking on the "Finish" button 708, the member's details are saved into a member profile for that user (130, 132, 138, or 140 of FIG. 1), after which a "group summary page" is displayed, as shown in FIG. 8. Clicking on the cancel button 710 returns the member to the page he/she was previously viewing, without saving the member's details.

FIG. 8 is an illustration of a graphical user interface of a "Group summary page" 800 used in accordance with an embodiment of the invention. Each group 802 that the user belongs to is displayed separately. Various options are provided for each group. Clicking on the "details" button 804 displays further details about the group account displayed in a "Specific group's summary page", as shown in FIG. 9. Clicking on the "remove me" button 808 removes the member from that group. Clicking on the "Settle up" button 806 allows the member to settle up his/her obligations with that group by preferably electronically transferring funds into the group account from the members bank account at a financial institution. Clicking on the "Asks folks to settle up" button 810 balances the group account and contacts the other members of that group, preferably via email, asking them to settle up their financial obligations with the group. A member may add another group or join an existing group by clicking on the "Add/Join a group" button 812. A member may furthermore adjust group options by clicking on the "Personal Options" button 814, after which an "options page" is displayed as per FIG. 13.

FIG. 9 is an illustration of a graphical user interface of a "Specific group's summary page" 900 used in accordance with an embodiment of the invention. This page displays summary details for a specific member in a specific group. Summary details preferably include the member's financial obligations to the group 902 as well as other members' financial obligations to the group 912. Clicking on the "Settle the slush fund" button 904 or the "Request settlement" button 1018 balances the group fund and contacts the other members of that group, preferably via email, asking them to settle up their financial obligations with the group. Clicking on the "Claim cash" button 906 allows the member to withdraw any funds owing to him/her from the group. Withdrawal of funds preferably occurs electronically by transferring funds from the group account to the member's account at a financial institution, but may occur via a credit card or an electronic or traditional check. Clicking on the "Remove/Allocate this" button 908 allows a member to remove himself from a group, thereby allocating any of his financial obligations between the remaining group members. If a potential member has been invited to join the group but has not yet joined, the member may click on the "Invite again" button 914 to contact the potential member to join the group. Likewise, entering an email address into the form provided and clicking on the "Add members" button 916 sends an email to the supplied email address inviting a potential member to join the group. Any member may also post a message to a message-board on the specific group's summary page by clicking on the "Post new message button" 918. A member may add a new transaction by clicking on the "Add new transaction" button 1016 which displays an "Add new transaction page", as shown in FIG. 11. A member may adjust his or her personal options by clicking on the "Personal Options" button 1022. A member can view the groups transaction history by clicking on the "view history" button 1024 which displays a "transaction history page", as shown in FIG. 10. A member may add another group or join an existing group by clicking on the "Add/Join a group" button 1026. A member may adjust a group's options by clicking on the "Group administration" button 1028, after which an "options page" is displayed as per FIG. 13. Finally, the member may return to the group summary page by clicking on the "Group summary" button 1020.

FIG. 10 is an illustration of a graphical user interface of a "Transaction history page" 1000 used in accordance with an embodiment of the invention. This page displays a specific group's transaction history 1032. A member can precisely adjust what part of the transaction history is displayed by entering a date range into forms 1002 and 1004, adjusting the pull down menu to display either an individual member of a group or the entire group 1034, adjusting the pull down menu 1006 to show who entered the transaction into the system, and/or adjusting the pull down menu 1008 to display which categories should be displayed.

Each group has a group type associated with it. So, one may have a "roommate" type group, a "party" type of group, or an "office pool" type of group. Each group has a given set of categories associated with it. Additionally, each group can add group specific categories. Categories preferably include "All categories", expenses, withdrawals, deposits, and any default or custom categories associated with the specific group. After adjusting the dates and pull down menus, the member clicks on the "search" button 1010 to initiate the search for the adjusted-transaction history details which are then displayed. Individual transactions may be deleted or modified by clicking on the "delete" 1012 or "modify" 1014 buttons respectively. The member may return to the "specific group's summary page" by clicking on the "Group detail" button 1030.

FIG. 11 is an illustration of a graphical user interface of an "Add new transaction page" 1100 used in accordance with an embodiment of the invention. This page is used by a member to add a new transaction to a group account. A transaction date is set to a default of the date the transaction page is displayed. The member may, however, change this date by modifying the date displayed in the transaction date field 1102. The member then selects a member or members of the group who began or initiated the transaction, such as an individual member, each member, or some or all the members. The member then adjusts a pull down menu 1104 showing what the selected member/s did, such as paid an amount on behalf of the group or deposited an amount into the group. The member enters the amount of the transaction in an amount field 1108. The member then assigns the transaction to individual members, each member, or some or all of the members. Assignment of the transaction is an assignment of the obligation for that transaction. A description of the transaction is entered by adjusting the pull down menu 1110 and 1114. To save the transaction and continue, the member clicks on the "Continue" button 1116. To cancel the transaction without saving the member clicks on the "Cancel" button 1118. If the transaction is complex, i.e. involves a more complex allocation or assignment of the transaction, such as splitting the transaction between group members, a "Complex transaction page" is displayed, as per FIG. 12.

FIG. 12 is an illustration of a graphical user interface of a "Complex transaction page" 1200 used in accordance with an embodiment of the invention. The complex transaction page allows a member to divide expenses up between members of a group. Each part of the split expense amount is entered separately for each member 1202. If a particular member is not responsible for any part of the expense, they may be excluded by checking an "exclude" box 1204. Alternatively, if the amount is to be split evenly between members, the member entering the transaction may click the "Split Evenly" button 1210 which will split the expense evenly between all the members (except those excluded). Clicking on the "Clear" button 1206 clears all split amounts, while clicking on the "Done" button 1208 saves the split amounts, and clicking on the "Cancel" button 1212 exits from this screen without saving.

FIG. 13 is an illustration of a graphical user interface of a "Group Options page" 1300 used in accordance with an embodiment of the invention. This page allows members to change the options of a particular group. By selecting the group as either public or private 1302 the members can allow or forbid other individuals to apply to join a group. In the case of a private group, only the members can invite another individual to join a group, where the individual is not made aware of the group prior to such an invitation. The members can also select whether they would like the system to automatically remind members 1304, preferably via email, to settle up after each transaction. Alternatively, the system may be set only to remind members to settle up when someone owes, or is owed, more that a predetermined amount set by the members, such as $500. The members may also select that the system reminds them to settle up after a certain time period, such as biweekly, or not to send automatic reminders at all 1306. Individual privileges for each member may also be set up 1312, such as by giving members of the group administrative rights or allowing them to withdraw cash from the account. An administrative right is preferably the right to modify the group's options, the right to add or delete members from a group, and/or the right to allow other members the right to withdraw cash from the group. Clicking on the "Submit changes" button 1314 saves changes made to the group options, while clicking on the "Cancel" button 1316 exits the member from the screen without saving.

FIG. 14 is an illustration of a graphical user interface of a "Join an Existing Group page" 1400 used in accordance with an embodiment of the invention. By entering their email address 1402 and clicking on the "Join an existing group" button 1404, an email is generated and sent to an existing member of a group to ask if the potential member who entered the email address, may join their group.

FIG. 15 is an illustration of a graphical user interface of a "Create a new group page" 1500 used in accordance with an embodiment of the invention. A new group may be created by entering a new group name 1502, selecting a type of group 1504 from a drop down menu, such as a roommate group, entering the email addresses of those people who the member would like to join the group, and altering the invitation message 1508, if necessary. Clicking on the "Go to group options page" 1510, saves these details in a new group profile (126 and 134 of FIG. 1) and displays the group option page, displayed in FIG. 13, to the founding member so that he or she might adjust the group's options. Clicking on the "Done" button saves the group with default options.

While the foregoing description and drawings represent the preferred embodiment of the present invention, it will be understood that various additions, modifications and substitutions may be made therein without departing from the spirit and scope of the present invention as defined in the accompanying claims. For example, members may pay funds into an account or withdraw funds from an account using a P2P system. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A non-transitory machine-readable medium including instructions which when executed by a processor of a machine, cause the machine to perform operations comprising:
    establishing a group fund corresponding to a shared expense of a group that includes a plurality of group members;
    receiving transaction details via an electronic network, the transaction details describing the shared expense and identifying at least one of the plurality of group members responsible for the shared expense;
    assigning the transaction details to the group; and
    allocating the shared expense specified by the transaction details among the plurality of group members of the group.

2. The non-transitory machine-readable medium of claim 1, further comprising balancing finances of the group.

3. The non-transitory machine-readable medium of claim 2, wherein the balancing includes:
    rounding up an original expense value of the shared expense to a new expense value having a predefined number of decimal places; and
    distributing a difference between the new expense value and the original expense value to a third party.

4. The non-transitory machine-readable medium of claim 1, wherein the receiving comprises acquiring transaction details which include remuneration details from a group member.

5. The non-transitory machine-readable medium of claim 1, wherein the receiving comprises acquiring allocation details dividing financial obligations of the group among said the plurality of group members.

6. The non-transitory machine-readable medium of claim 1, wherein the allocating includes:
    debiting the group fund with the shared expense specified in the transaction details; and
    allotting the expense among said the plurality group members in a manner specified in the transaction details.

7. The non-transitory machine-readable medium of claim 1, wherein the allocating includes:
    crediting the group fund with remuneration specified in the transaction details; and
    allotting the remuneration among the group members in a manner specified in the transaction details.

8. The non-transitory machine-readable medium of claim 1, further comprising charging a group member interest for paying the group fund late.

9. The non-transitory machine-readable medium of claim 1, further comprising determining that a group member has made an early payment and paying the group member interest on an amount of the payment until the payment is due.

10. The non-transitory machine-readable medium of claim 1, further comprising determining that one group member is delinquent in paying a share of a shared expense and removing the one group member from the group.

11. An apparatus comprising:
    a server controlled by a financial institution, the server comprising, a memory; and
    a data processor to execute instructions, the execution of the instructions is to cause receipt of transaction details via an electronic network, the transaction details describing a group expense and identifying at least one of the plurality of group members as being responsible for the group expense,
    the execution of the instructions is to further cause allocation of the group expense specified by the transaction details among one or more of the plurality of group members of the group, and is to cause storage of the transaction details and the allocation of the group expense in the memory.

12. The apparatus of claim 11, wherein the execution of the instructions by the data processor is to cause a balancing of finances of the group.

13. The apparatus of claim 11, wherein the receipt of the transaction details comprises execution of instructions to cause acquisition of remuneration details from a group member.

14. The apparatus of claim 11, wherein the receipt of the transaction details comprises execution of instructions to cause acquisition of allocation details dividing financial obligations of the group among the group members.

15. The apparatus of claim 11, wherein the data processor is to execute instructions to cause a charge of interest to a group member for paying a group fund late.

16. The apparatus of claim 11, wherein the data processor is to execute instructions to cause a determination that a group member has made an early payment and to cause payment of interest to the group member on an amount of the payment until the payment is due.

17. A computer-implemented method comprising:
    establishing, using a processor, a group fund corresponding to a shared expense of a group that includes a plurality of group members;
    receiving a request from a current group member of the plurality of group members to add a new group member to the plurality of group members;
    transmitting the request to the new group member;

adding, based on input from the new group member, the new group member to the plurality of group members; and allocating the shared expense among the plurality of group members that includes the new group member.

18. The computer-implemented method of claim 17, further comprising balancing finances of the group.

19. The computer-implemented method of claim 18, wherein the balancing includes:
rounding up an original expense value to a new expense value having a predefined number of decimal places; and
distributing a difference between the new expense value and the original expense value to a third party.

20. The computer-implemented method of claim 17, further comprising receiving transaction details from a group member via an electronic network, the transaction details identifying the shared expense and at least one of the plurality of group members responsible for the shared expense, wherein the allocating of the shared expense is based on the transaction details.

21. The computer-implemented method of claim 20, wherein the allocating includes debiting the group fund with the shared expense.

22. The computer-implemented method of claim 17, further comprising charging a group member interest for paying the group fund late.

23. The computer-implemented method of claim 17, further comprising determining that a group member has made an early payment and paying the group member interest on the amount of the payment until the payment is due.

24. The computer-implemented method of claim 17, further comprising determining that one group member is delinquent in paying a share of a group expense and removing the one group member from the group.

25. A computer-implemented method comprising:
establishing, using a processor, a group fund of a group that includes a plurality of group members;
deleting a group member of the plurality of group members; and
allocating funds in the group fund assigned to the group member being deleted among remaining group members of the plurality of group members.

26. The computer-implemented method of claim 25, further comprising allocating a shared expense among remaining group members.

27. The computer-implemented method of claim 26, further comprising receiving transaction details via an electronic network, the transaction details identifying the shared expense and at least one of the plurality of group members responsible for the shared expense.

28. The computer-implemented method of claim 27, wherein the allocating includes:
debiting the group fund with the shared expense specified in the transaction details; and
allotting the shared expense among the remaining group members in a manner specified in the transaction details.

29. The computer-implemented method of claim 25, further comprising charging a group member interest for paying the group fund late.

30. The computer-implemented method of claim 25, further comprising determining that a group member has made an early payment and paying the group member interest on the amount of the payment until the payment is due.

31. The computer-implemented method of claim 25, further comprising determining that one group member is delinquent in paying his share of a group expense and removing the one group member from the group.

32. A computer-implemented method comprising:
establishing, using a processor, a group fund for payment of a shared expense of a group that includes a plurality of group members;
assigning a transaction to the group fund, the transaction being associated with the shared expense; and
modifying the transaction based on input from a group member of the plurality of group members.

33. The computer-implemented method of claim 32, including allocating the shared expense of the modified transaction among the plurality of group members.

34. The computer-implemented method of claim 32, including deleting the transaction or a different transaction based on input from a group member of the plurality of group members.

35. The computer-implemented method of claim 32, including balancing finances of the group.

36. The computer-implemented method of claim 35, wherein the balancing includes:
rounding up an original expense value to a new expense value; and
distributing a difference between the new expense value and the original expense value to a third party.

37. The computer-implemented method of claim 32, wherein the receiving comprises acquiring allocation details dividing financial obligations of the group among the plurality of group members.

38. The computer-implemented method of claim 32, including settling the group fund through an electronic network.

39. The computer-implemented method of claim 38, wherein the settling comprises transferring funds from the group fund to a financial institution account of a specific group member.

40. The computer-implemented method of claim 32, further comprising charging a specific group member interest for paying the group fund late.

41. The computer-implemented method of claim 32, further comprising determining that a group member has made an early payment and paying the group member interest on the amount of the payment until the payment is due.

42. The computer-implemented method of claim 32, further comprising determining that one group member is delinquent in paying their share of a group expense and removing the one group member from the group.

43. A computer-implemented method comprising:
establishing, using a processor, a group fund for a group that includes a plurality of group members;
receiving a transaction to remunerate one or more group members, the transaction being to credit the group fund;
assigning the transaction to the group; and
allocating the credit specified by the transaction among the one or more group members to be remunerated.

44. The computer-implemented method of claim 43, including deleting the transaction or a different transaction based on input from a group member of the plurality of group members.

45. The computer-implemented method of claim 43, including balancing finances of the group.

46. The computer-implemented method of claim 45, wherein the balancing includes:
rounding up an original expense value to a new expense value; and
distributing a difference between the new expense value and the original expense value to a third party.

47. The computer-implemented method of claim 43, wherein the receiving comprises acquiring allocation details dividing financial obligations of the group among the plurality of group members.

48. The computer-implemented method of claim 43, further comprising settling the group fund through an electronic network, wherein the settling comprises transferring funds from the group fund to a financial institution account of a group member.

\* \* \* \* \*